United States Patent [19]

Staendeke et al.

[11] Patent Number: 4,957,950

[45] Date of Patent: Sep. 18, 1990

[54] FLAME-RETARDANT POLYMER COMPOSITIONS

[75] Inventors: Horst Staendeke, Lohmar, Fed. Rep. of Germany; Daniel Scharf, East Greenwich, R.I.

[73] Assignee: Hoechst Aktiengesellschaft, Hurth Knapsack, Fed. Rep. of Germany

[21] Appl. No.: 243,324

[22] Filed: Sep. 9, 1988

[30] Foreign Application Priority Data

Sep. 25, 1987 [DE] Fed. Rep. of Germany ....... 3732377

[51] Int. Cl.$^5$ ............................ C08K 7/14; C08K 9/04; C08K 3/32; C08K 3/22
[52] U.S. Cl. .................................. 523/205; 523/208; 523/451; 523/506
[58] Field of Search ..................... 523/205, 208, 506; 524/416

[56] References Cited

U.S. PATENT DOCUMENTS

| 3,810,862 | 5/1974 | Mathis et al. | 524/100 |
| 4,198,493 | 4/1980 | Marciandi | 524/416 |
| 4,340,579 | 7/1982 | Greber et al. | 423/625 |
| 4,421,876 | 12/1983 | Greber et al. | 523/402 |
| 4,772,642 | 9/1988 | Staendeke | 523/205 |

FOREIGN PATENT DOCUMENTS

| 0204027 | 12/1986 | European Pat. Off. | |
| 54-022450 | 2/1979 | Japan | 524/416 |

*Primary Examiner*—Lewis T. Jacobs
*Attorney, Agent, or Firm*—Connolly and Hutz

[57] ABSTRACT

Flame-retardant polymer compositions contain a flame-retardant system consisting of a phosphorus/nitrogen-component, aluminum hydroxide, and a least one synergetically active component selected from the group consisting of organic nitrogen compounds, polyalcohols or derivatives thereof, the phosphorus/nitrogen-component being ammonium polyphosphate, if desired.

20 Claims, No Drawings

FLAME-RETARDANT POLYMER COMPOSITIONS

This invention relates to flame-retardant polymer compositions, preferably duroplastic polymer compositions and more preferably to unsaturated polyester resins.

It is known that flame-retardant properties can be imparted to unsaturated polyester resins by admixing these resins either with an inorganic flame-retardant agent, such as aluminum hydroxide, or organic flame-retardant agent, such as a chloroparaffin or a halogenated biphenyl, or by chemically modifying the acid or alcohol component of the unsaturated monomer, commonly by halogenation. In the event of the unsaturated polyester being one containing halogen, the polyester is frequently admixed additionally with antimony trioxide acting as a synergist (cf. "Handbook of Plastics Flammability and Combustion Toxicology", Noyes Publications, Park Ridge, N.J., U.S.A. (1983)).

In U.S. Pat. No. 3,810,862, it has been disclosed that flame-retardant properties can be imparted to polyolefins using a mixture of ammonium polyphosphate, melamine and dipentaerythritol or of melamine pyrophosphate and dipentaerythritol.

Flame-retardant systems based on ammonium polyphosphate, melamine and polyamide 6 have been disclosed in U.S. Pat. No. 4,198,493, and further systems of this kind based on ammonium polyphosphate, melamine and tris-2-hydroxyethylisocyanurate or ammonium polyphosphate, pentaerythritol or tripentaerythritol and tris-2-hydroxyethyl-isocyanurate, and also ammonium polyphosphate, cyanuric acid and tris-2-hydroxyethyl-isocyanurate have been disclosed in U.S. Pat. No. 4,198,493.

Still further compositions based on ammonium polyphosphate, melamine-cyanurate and hydroxyalkyl esters of isocyanuric acid have been suggested in EP-PS No. 204 027 for imparting flame-retardant properties to polyolefins.

Although aluminum hydroxide used separately and combinations of ammonium polyphosphate with a synergetically active compound were found to have no effective flame-retardant activity for unsaturated polyesters, we have now unexpectedly discovered that the combination of aluminum hydroxide with ammonium polyphosphate and various synergetically active substances is a highly effective flame-retardant system for unsaturated polyesters.

The term unsaturated polyester resin (UP-resins) is used herein to denote those products which are obtainable by means of a condensation reaction from saturated or unsaturated dicarboxylic acids or their anhydrides and a diol. The dicarboxylic acids most useful for this purpose are maleic acid, which is commonly used in the form of its anhydride, and fumaric acid. Propane diol-1,2 is the representative customarily selected from the diol series. Styrene which is miscible with a polyester resin in whatever ratio and is easy to copolymerize, is the reactive monomer most frequently used. Unsaturated polyester resins normally contain between 30 and 40 weight % of styrene (cf. Ullmanns Encyklopädie der technischen Chemie, volume 19, pages 79–88, Verlag Chemie, Weinheim, (1980)).

The present invention relates more particularly to a flame-retardant polymer composition which is characterized in that it contains a flame-retardant system consisting essentially of a phosphorus/nitrogen-component, aluminum hydroxide, and at least one synergetically active component selected from the group consisting of organic nitrogen compounds, polyalcohols or derivatives thereof.

Further preferred and separate features typical of the flame-retardant polymer compositions of this invention provide:

(a) for the flame-retardant polymer composition to contain, as the phosphorus/nitrogen-component, 5–45 parts by weight of ammonium polyphosphate per 100 parts by weight of polymer;

(b) for the said ammonium polyphosphate to contain 0.5–25 weight % of a water-insoluble artificial, preferably cured, resin encapsulating the individual ammonium polyphosphate particles;

(c) for the said ammonium polyphosphate to contain 0.5–25 weight % of a reaction product of a polyisocyanate with a carbodiimidization catalyst, the polycarbodiimide formed encapsulating the individual ammonium polyphosphate particles;

(d) for the said ammonium polyphosphate to contain 0.5–25 weight % of a reaction product of a polyisocyanate and a polyhydroxy compound, the polyurethane formed encapsulating the individual ammonium polyphosphate particles;

(e) for the said ammonium polyphosphate to contain 0.5–25 weight % of a reaction product of a polyisocyanate with a trimerization catalyst, the polyisocyanurate formed encapsulating the individual ammonium polyphosphate particles;

(f) for the said ammonium polyphosphate to contain 0.5–25 weight % of a reaction product of a polyisocyanate and water, the polyurea formed encapsulating the individual ammonium polyphosphate particles;

(g) for the said ammonium polyphosphate to contain 0.5–25 weight % of a cured melamine/formaldehyde resin, the melamine/formaldehyde resin encapsulating the individual ammonium polyphosphate particles;

(h) for the said ammonium polyphosphate to contain 0.5–25 weight % of a cured epoxide resin, the epoxide resin encapsulating the individual ammonium polyphosphate particles;

(i) for the organic nitrogen compound used to be melamine and/or a melamine derivative;

(j) for the organic nitrogen compound used to be cyanuric acid or isocyanuric acid and/or a derivative of these acids;

(k) for the organic nitrogen compound used to be condensation product of ethylene, urea and formaldehyde;

(l) for the polyalcohol used to be pentaerythritol and/or a derivative thereof;

(m) for the polyalcohol used to be dipentaerythritol and/or a derivative thereof;

(n) for the flame-retardant polymer composition to contain 1 to 25 parts by weight of the synergetically active component per 100 parts by weight of polymer;

(o) for the said flame-retardant polymer composition to contain 50–175 parts by weight of aluminum hydroxide per 100 parts by weight of polymer;

(p) for the said flame-retardant polymer composition to contain the said ammonium polyphosphate and said synergetically active component in a ratio by weight of 1:1 to 10:1;

(q) for the said flame-retardant composition to contain the said aluminum hydroxide and said combination of ammonium polyphosphate and synergetically active component in a ratio by weight of 1:1 to 15:1;

(r) for the said flame-retardant polymer composition to be a duroplastic;

(s) for the said flame-retardant polymer composition to be an unsaturated polyester;

(t) for the said flame-retardant polymer composition to be reinforced by means of glass fibers.

The aluminum hydroxide should conveniently be used in the form of those products which have been disclosed in U.S. Pat. Nos. 4,340,579 and 4,421,876, respectively.

The ammonium polyphosphate which should preferably be used is a free-flowing, pulverulent, scarcely water-soluble ammonium polyphosphate of the formula $(NH_4PO_3)_n$, where n is a number between 20 and 1000, especially 500 and 1000; it should preferably be used in the form of particles of which more than 99% have a size of less than 45 μm.

The following Examples and Tables illustrate the invention in greater detail which however is naturally not limited thereto. The parts are by weight unless otherwise stated.

EXAMPLE 1

1. Preparation of Blend of Polyester/Flame-Retardant Agent 100 parts ® ALPOLIT UP 002 (a registered Trade Mark of Hoechst Aktiengesellschaft, Frankfurt/Main, Federal Republic of Germany)—it is a slightly viscous, highly reactive unsaturated polyester resin dissolved in styrene.

100 parts ® APYRAL 2 (a registered Trade Mark of VAW; Vereinigte Aluminium Werke AG, Bonn, Federal Republic of Germany)—it is an aluminum hydroxide originating from the BAYER-process and modified by the process disclosed in EP-PS No. 11 667 ($\hat{=}$U.S. Pat. Nos. 4,340,579, 4,421,876).

0.3 part cobalt accelerator NL 49 P (a product of Akzo Chemie GmbH, Düren, Federal Republic of Germany)—it is a cobalt octoate solution in dibutylphthalate containing 1 weight % cobalt.

were mixed in a suitable container using a dissolver disc.

Next, 2.0 parts butanox M 50 (a product of Akzo Chemie GmbH, Düren)—it is methylethylketone peroxide desensitized with dimethyl phthalate, and available as a clear, colorless liquid containing at least 9 weight % active oxygen—and the whole is mixed once again.

2. Preparation of UP-Resin Laminates

Approximately 50% of the blend of polyester/flame-retardant agent was regularly distributed on a parting film (®HOSTAPHAN RN 100/0.1 mm thick, a registered Trade Mark of Hoechst Aktiengesellschaft). Next, a matched, styrene-insoluble textile glass mat having a surface weight of 450 g/m² was placed thereon. By means of a lambskin roller, the second 50% portion of the blend of polyester/flame-retardant agent was regularly distributed on the glass mat and the occluded air was expelled. The laminate was then covered with a further parting film.

3. Preparation of Test Plate

The laminate was given into a warm water-heated BECKER-VAN HÜLLEN press and molded at a temperature of 50° C., under a pressure of 10 bars and over a period of about 1 hour into a test plate 1.6 mm thick.

4. Flammability Tests 4.1 The flammability of the composition was tested in accordance with the Underwriters Laboratories procedure "Test of Flammability of Plastic Material"-UL 94 dated as of May 2, 1975, on specimens 127 mm long, 12.7 mm wide and 1.6 mm thick.

4.2 The oxygen index was determined in a modified apparatus substantially in accordance with ASTM-D 2863-74

The results of the flammability tests are reported in Table 1.

EXAMPLES 2–62

The test plates were made and tested as described in Example 1. The data indicated in Tables 1–12, columns 2 and 3 relate to flame-retardant agents different in nature and concentration from those used in Example 1.

In addition to this, the following products were used in Examples 2–62.

®EXOLIT 422 (a registered Trade Mark of Hoechst Aktiengesellschaft)—it is a fine particulate, scarcely water-soluble ammonium polyphosphate of the formula $(NH_4PO_3)_n$, where n is about 700; more than 99% of the ammonium polyphosphate particles have a size of less than 45 μm.

®EXOLIT 462 (a registered Trade Mark of Hoechst Aktiengesellschaft)—it is a microencapsulated ammonium polyphosphate obtained by the process disclosed in EP-B-0 180 795, containing about 10 weight % encapsulating material consisting of a cured melamine/formaldehyde resin.

®EXOLIT 455 (a registered Trade Mark of Hoechst Aktiengesellschaft)—it is a microencapsulated ammonium polyphosphate obtained by the process disclosed in U.S. Pat. No. 4,514,328, containing about 10 weight % encapsulating material consisting of an epoxide resin.

®EXOLIT 470 (a registered Trade Mark of Hoechst Aktiengesellschaft)—it is a microencapsulated ammonium polyphosphate obtained by the process disclosed in DE-OS No. 35 26 006, containing about 10% encapsulating material consisting of the reaction product of a polyisocyanate with a carbodiimidization catalyst.

®SPINFLAM MF 80 (a registered Trade Mark of Montefluos, Milano, Italy)—it is a condensation product of ethylene urea and formaldehyde, containing 28% nitrogen.

As can be inferred from Tables 1–5, neither aluminum hydroxide nor a combination of ammonium polyphosphate with a synergetically active component permit an unsaturated polyester which has been treated therewith to be classified in any of UL 94-classes V-2 to V-0.

In clear contrast with this, it is evident from Tables 6–12 that even minor quantities of the various ammonium polyphosphates used in combination with the synergetically active component and aluminum hydroxide unexpectedly permit the UL 94-classes V-1 and V-0 to be reliably obtained.

TABLE 1

Flammability Test in Accordance with UL-94-vertical test[1]
Oxygen Index in Accordance with ASTM-D 2863-74

| Compar. Examples | Material | Flame-retardant System Quantity parts/100 parts UP[2] | Total quantity parts/100 parts UP[2] | UL-94-vertical test | Oxygen Index |
|---|---|---|---|---|---|
| 1 | APYRAL 2 | 100 | 100 | n.c.[3] | 0.30 |
| 2 | APYRAL 2 | 125 | 125 | n.c. | 0.32 |
| 3 | APYRAL 2 | 150 | 150 | n.c. | 0.33 |
| 4 | APYRAL 2 | 175 | 175 | n.c. | 0.36 |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]n.c. = not classified as V-0, V-1 or V-2

TABLE 2

Flammability Test in Accordance with UL-94-vertical test[1]
Oxygen Index in Accordance with ASTM-D 2863-74

| Compar. Examples | Material | Flame-retardant System Quantity parts/100 parts UP[2] | Total quantity parts/100 parts UP[2] | UL-94-vertical test | Oxygen Index |
|---|---|---|---|---|---|
| 5 | EXOLIT 422 | 15 | 25 | n.c.[3] | 0.24 |
|  | Melamine | 5 |  |  |  |
|  | Pentaaerythritol | 5 |  |  |  |
| 6 | EXOLIT 462 | 15 | 25 | n.c. | 0.23 |
|  | Melamine | 5 |  |  |  |
|  | Pentaaerythritol | 5 |  |  |  |
| 7 | EXOLIT 422 | 22.5 | 37.5 | n.c. | 0.25 |
|  | Melamine | 7.5 |  |  |  |
|  | Pentaaerythritol | 7.5 |  |  |  |
| 8 | EXOLIT 462 | 22.5 | 37.5 | n.c. | 0.25 |
|  | Melamine | 7.5 |  |  |  |
|  | Pentaaerythritol | 7.5 |  |  |  |
| 9 | EXOLIT 422 | 30 | 50 | n.c. | 0.26 |
|  | Melamine | 10 |  |  |  |
|  | Pentaaerythritol | 10 |  |  |  |
| 10 | EXOLIT 462 | 30 | 50 | n.c. | 0.26 |
|  | Melamine | 10 |  |  |  |
|  | Pentaaerythritol | 10 |  |  |  |
| 11 | EXOLIT 422 | 45 | 75 | V-0 | 0.29 |
|  | Melamine | 15 |  |  |  |
|  | Pentaaerythritol | 15 |  |  |  |
| 12 | EXOLIT 462 | 45 | 75 | V-0 | 0.35 |
|  | Melamine | 15 |  |  |  |
|  | Pentaaerythritol | 15 |  |  |  |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]n.c. = not classified as V-0, V-1 or V-2

TABLE 3

Flammability Test in Accordance with UL-94-vertical test[1]
Oxygen Index in Accordance with ASTM-D 2863-74

| Compar. Examples | Material | Flame-retardant System Quantity parts/100 parts UP[2] | Total quantity parts/100 parts UP[2] | UL-94-vertical test | Oxygen Index |
|---|---|---|---|---|---|
| 13 | EXOLIT 422 | 25 | 50 | n.c.[3] | 0.25 |
|  | Spinflam MF 80 | 25 |  |  |  |
| 14 | EXOLIT 422 | 37.5 | 50 | n.c. | 0.25 |
|  | Spinflam MF 80 | 12.5 |  |  |  |
| 15 | EXOLIT 462 | 25 | 50 | n.c. | 0.;24 |
|  | Spinflam MF 80 | 25 |  |  |  |
| 16 | EXOLIT 462 | 37.5 | 50 | n.c. | 0.25 |
|  | Spinflam MF 80 | 12.5 |  |  |  |
| 17 | EXOLIT 422 | 50 | 75 | n.c.[3] | 0.29 |
|  | Spinflam | 25 |  |  |  |

TABLE 3-continued

Flammability Test in Accordance with UL-94-vertical test[1]
Oxygen Index in Accordance with ASTM-D 2863-74

| Compar. Examples | Material | Flame-retardant System | | UL-94-vertical test | Oxygen Index |
|---|---|---|---|---|---|
| | | Quantity parts/100 parts UP[2] | Total quantity parts/100 parts UP[2] | | |
| 18 | MF 80 EXOLIT 422 Spinflam MF 80 | 60 15 | 75 | n.c. | 0.30 |
| 19 | EXOLIT 462 Spinflam MF 80 | 50 25 | 75 | n.c. | 0.31 |
| 20 | EXOLIT 462 Spinflam MF 80 | 60 15 | 75 | n.c. | 0.33 |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]n.c. = not classified as V-0, V-1 or V-2

TABLE 4

Flammability Test in Accordance with UL-94-vetical test[1]
Oxygen Index in Accordance with ASTM-D 2863-74

| Compar. Examples | Material | Flame-retardant System | | UL-94-vertical test | Oxygen Index |
|---|---|---|---|---|---|
| | | Quantity parts/100 parts UP[2] | Total quantity parts/100 parts UP[2] | | |
| 21 | EXOLIT 422 THEIC[4] | 25 25 | 50 | n.c.[3] | 0.25 |
| 22 | EXOLIT 422 THEIC | 37.5 12.5 | 50 | n.c. | 0.27 |
| 23 | EXOLIT 462 THEIC | 25 25 | 50 | n.c. | 0.25 |
| 24 | EXOLIT 455 THEIC | 25 25 | 50 | n.c. | 0.26 |
| 25 | EXOLIT 455 THEIC[4] | 37.5 12.5 | 50 | n.c.[3] | 0.27 |
| 26 | EXOLIT 470 THEIC | 25 25 | 50 | n.c. | 0.28 |
| 27 | EXOLIT 470 THEIC | 37.5 12.5 | 50 | n.c. | 0.28 |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]n.c. = not classified as V-0, V-1 or V-2
[4]THEIC = tris-(2-hydroxyethyl)-isocyanurate

TABLE 5

Flammability Test in Accordance with UL-94-vertical test[1]
Oxygen Index in Accordance with ASTM-D 2863-74

| Compar. Examples | Material | Flame-retardant System | | UL-94-vertical test | Oxygen Index |
|---|---|---|---|---|---|
| | | Quantity parts/100 parts UP[2] | Total quantity parts/100 parts UP[2] | | |
| 28 | EXOLIT 422 MCY[5] | 37.5 12.5 | 50 | n.c.[3] | 0.24 |
| 29 | EXOLIT 422 DIPIT[6] | 37.5 12.5 | 50 | n.c. | 0.26 |
| 30 | EXOLIT 422 THEIC[4] DIPIT | 30 10 10 | 50 | n.c. | 0.26 |
| 31 | EXOLIT 422 MCY DIPIT | 30 10 10 | 50 | n.c. | 0.26 |
| 32 | EXOLIT 422 MCY[5] THEIC[4] | 33 10 10 | 50 | n.c.[3] | 0.25 |
| 33 | EXOLIT 462 MCY THEIC | 30 10 10 | 50 | n.c. | 0.26 |
| 34 | EXOLIT 455 MCY THEIC | 30 10 10 | 50 | n.c. | 0.27 |
| 35 | EXOLIT 470 MCY | 30 10 | 50 | n.c. | 0.28 |

TABLE 5-continued

Flammability Test in Accordance with UL-94-vertical test[1]
Oxygen Index in Accordance with ASTM-D 2863-74

| Compar. Examples | Material | Flame-retardant System Quantity parts/100 parts UP[2] | Total quantity parts/100 parts UP[2] | UL-94- vertical test | Oxygen Index |
|---|---|---|---|---|---|
| | THEIC | 10 | | | |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]n.c. = not classified as V-0, V-1 or V-2
[4]THEIC = tris-(2-hydroxyethyl)-isocyanurate
[5]melamine cyanurate
[6]DIPIT = dipentaerythritol

TABLE 6

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantityu parts/100 parts UP[2] | UL-94- vertical test | Oxygen Index |
|---|---|---|---|---|---|
| 36 | EXOLIT 422 | 30 | 100 | V-1 | 0.36 |
| | Melamine | 10 | | | |
| | Pentaaerythritol | 10 | | | |
| | APYRAL 2 | 50 | | | |
| 37 | EXOLIT 422 | 36 | 100 | V-0 | 0.37 |
| | Melamine | 7 | | | |
| | Pentaaerythritol | 7 | | | |
| | APYRAL 2 | 50 | | | |
| 38 | EXOLIT 422 | 15 | 150 | V-1 | 0.39 |
| | Melamine | 5 | | | |
| | Pentaerythritol | 5 | | | |
| | APYRAL 2 | 125 | | | |
| 39 | EXOLIT 462 | 15 | 150 | V-1 | 0.40 |
| | melamine | 5 | | | |
| | Pentarythritol | 5 | | | |
| | APYRAL 2 | 125 | | | |
| 40 | EXOLIT 455 | 15 | 150 | V-0 | 0.39 |
| | Melamine | 5 | | | |
| | Pentarythritol | 5 | | | |
| | APYRAL 2 | 125 | | | |
| 41 | EXOLIT 470 | 15 | 150 | V-1 | 0.39 |
| | Melamine | 5 | | | |
| | Pentaerythritol | 5 | | | |
| | APYRAL 2 | 125 | | | |

[1]Underwriters Laboratories "Test for Flammability of Plastic Material-UL 94" specimens: 127 mm long, 12.7 mm wide and 1.6 mm thick
[2]UP = ®ALPOLIT UP 002;

TABLE 7

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94- vertical test | Oxygen Index |
|---|---|---|---|---|---|
| 42 | EXOLIT 462 | 37.5 | 100 | V-1 | 0.30 |
| | MF 80 | 12.5 | | | |
| | APYRAL 2 | 50 | | | |
| 43 | EXOLIT 462 | 37.5 | 150 | V-0 | 0.38 |
| | MF 80 | 12.5 | | | |
| | APYRAL 2 | 100 | | | |
| 44 | EXOLIT 455 | 20 | 175 | V-0 | 0.45 |
| | MF 80 | 5 | | | |
| | APYRAL 2 | 150 | | | |
| 45 | EXOLIT 455 | 16 | 170 | V-0 | 0.43 |
| | MF 80 | 4 | | | |
| | APYRAL | 150 | | | |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]MF 80 = ®Spinflam MF 80

TABLE 8

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 46 | EXOLIT 462 | 40 | 150 | V-0 | 0.38 |
|  | THEIC[3] | 10 |  |  |  |
|  | APYRAL 2 | 100 |  |  |  |
| 47 | EXOLIT 462 | 20 | 150 | V-0 | 0.36 |
|  | THEIC | 5 |  |  |  |
|  | APYRAL 2 | 125 |  |  |  |
| 48 | EXOLIT 462 | 12 | 165 | V-0 | 0.41 |
|  | THEIC | 3 |  |  |  |
|  | APYRAL 2 | 150 |  |  |  |
| 49 | EXOLIT 462 | 8 | 160 | V-1 | 0.39 |
|  | THEIC | 2 |  |  |  |
|  | APYRAL 2 | 150 |  |  |  |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]THEIC = tris-(2-hydroxyethyl)-isocyanurate

TABLE 9

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 50 | EXOLIT 462 | 20 | 175 | V-0 | 0.41 |
|  | MCY[3] | 5 |  |  |  |
|  | APYRAL 2 | 150 |  |  |  |
| 51 | EXOLIT 462 | 16 | 170 | V-0 | 0.37 |
|  | MCY | 4 |  |  |  |
|  | APYRAL 2 | 150 |  |  |  |
| 52 | EXOLIT 462 | 12 | 165 | V-1 | 0.36 |
|  | MCY | 3 |  |  |  |
|  | APYRAL 2 | 150 |  |  |  |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]MCY = melamine cyanurate

TABLE 10

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 53 | EXOLIT 470 | 20 | 175 | V-0 | 0.44 |
|  | DIPIT[3] | 5 |  |  |  |
|  | APYRAL 2 | 150 |  |  |  |
| 54 | EXOLIT 470 | 16 | 170 | V-0 | 0.42 |
|  | DIPIT | 4 |  |  |  |
|  | APYRAL 2 | 150 |  |  |  |
| 55 | EXOLIT 470 | 12 | 165 | V-1 | 0.41 |
|  | DIPIT | 3 |  |  |  |
|  | APYRAL 2 | 150 |  |  |  |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]DIPIT = dipentaerythritol

TABLE 11

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 56 | EXOLIT 422 | 15 | 150 | V-0 | 0.38 |
|  | THEIC[3] | 5 |  |  |  |
|  | DIPIT[4] | 5 |  |  |  |
|  | APYRAL | 125 |  |  |  |
| 57 | EXOLIT 470 | 15 | 150 | V-0 | 0.40 |
|  | THEIC | 5 |  |  |  |

TABLE 11-continued

Flammability Test in Accordance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 58 | DIPIT | 5 | | | |
|  | APYRAL 2 | 125 | | | |
|  | EXOLIT 462 | 15 | 150 | V-0 | 0.37 |
|  | MCY[5] | 5 | | | |
|  | DIPIT | 5 | | | |
|  | APYRAL 2 | 125 | | | |
| 59 | EXOLIT 470 | 15 | 150 | V-0 | 0.38 |
|  | MCY | 5 | | | |
|  | DIPIT | 5 | | | |
|  | APYRAL 2 | 125 | | | |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]THEIC = tris-(2-hydroxyethyl)-isocyanurate
[4]DIPIT = dipentaerythritol
[5]MCY = melamine cyanurate

TABLE 12

Flammability Test in Accoedance with UL-94-vertical test[1]
Oxygen Index in Accordance with ASTM-D 2863-74

| Examples of invention | Material | Flame-retardant System Quantity parts/100 parts UP[2] | Total quantity parts/100 parts UP[2] | UL-94-vertical test | Oxygen Index |
|---|---|---|---|---|---|
| 60 | EXOLIT 462 | 30 | 150 | V-0 | 0.35 |
|  | MCY[3] | 10 | | | |
|  | THEIC[4] | 10 | | | |
|  | APYRAL 2 | 100 | | | |
| 61 | EXOLIT 462 | 15 | 150 | V-0 | 0.37 |
|  | MCY | 5 | | | |
|  | THEIC | 5 | | | |
|  | APYRAL 2 | 125 | | | |
| 62 | EXOLIT 462 | 12 | 170 | V-0 | 0.40 |
|  | MCY | 4 | | | |
|  | THEIC | 4 | | | |
|  | APYRAL 2 | 150 | | | |

[1]Underwriters Laboratories "Test for Flammability of Plastic Material-UL 94" specimens: 127 mm long, 12.7 mm wide and 1.6 mm thick
[2]UP = ®ALPOLIT UP 002;
[3]MCY = melamine cyanurate
[4]THEIC = tris-(2-hydroxyethyl)-isocyanurate

We claim:

1. A flame-retardant unsaturated polyester resin composition, containing a flame-retardant system comprised of 5 to 45 parts by weight ammonium polyphosphate per 100 parts by weight polymer, 50 to 175 parts by weight of aluminum hydroxide per 100 parts by weight polymer and at least 1 to 25 parts by weight of a synergetically active component selected from the group consisting of organic nitrogen compounds, polyalcohols, derivatives of polyalcohols and combinations of said synergetically active components per 100 parts by weight of polymer; said ammonium polyphosphate containing 0.5 to 25 weight % of a water-insoluble synthetic resin encapsulating the individual ammonium polyphosphate particles; said organic nitrogen compounds being selected from the group consisting of melamine, cyanuric acid, isocyanuric acid and derivatives thereof and a condensation product of ethylene, urea and formaldehyde; said polyalcohol being selected from the group consisting of pentaerythritol, dipentaerythritol and derivatives thereof; and said aluminum hydroxide and the combination of ammonium polyphosphate and synergetically active component being contained in a ratio by weight of 1:1 to 15:1.

2. A flame-retardant polymer composition as claimed in claim 1, containing the said ammonium polyphosphate and said synergetically active component in a ratio by weight of 1:1 to 10:1.

3. A flame-retardant polymer composition as claimed in claim 1, wherein the said polymer is a polymer reinforced by glass fibres.

4. A flame-retardant polymer composition as claimed in claim 1, wherein the said water-insoluble synthetic resin is cured.

5. A flame retardant polymer composition as claimed in claim 1, wherein said ammonium polyphosphate has been encapsulated by a polycarbodiimide formed by reaction of a polyisocyanate with a carbodiimidization catalyst.

6. A flame retardant polymer composition as claimed in claim 1, wherein said ammonium polyphosphate has been encapsulated by a polyurethane formed by reaction of a polyisocyanate and a polyhydroxy compound.

7. A flame-retardant polymer composition as claimed in claim 1, wherein said ammonium polyphosphate has been encapsulated by a polyisocyanurate formed by reaction of a polyisocyanate with a trimerization catalyst.

8. A flame-retardant polymer composition as claimed in claim 1, wherein said ammonium polyphosphate has been encapsulated by a polyurea formed by reaction of a polyisocyanate and water.

9. A flame-retardant polymer composition as claimed in claim 1, wherein said ammonium polyphosphate has been encapsulated by a cured melamine/formaldehyde-resin.

10. A flame-retardant polymer composition as claimed in claim 1, wherein said ammonium polyphosphate has been encapsulated by a cured epoxide resin.

11. A flame-retardant unsaturated polyester resin, containing a flame-retardant system comprised of 8 to 40 parts by weight ammonium polyphosphate per 100 parts by weight polymer, 50 to 150 parts by weight of aluminum hydroxide per 100 parts by weight polymer and at least 2 to 20 parts by weight of a synergetically active component selected from the group consisting of organic nitrogen compounds, polyalcohols, derivatives of polyalcohols and combinations of said synergetically active components per 100 parts by weight polymer; said ammonium polyphosphate containing 0.5 to 25 weight % of a water-insoluble synthetic resin encapsulating the individual ammonium polyphosphate particles; said organic nitrogen compounds being selected from the group consisting of melamine, cyanuric acid, isocyanuric acid and derivatives thereof and a condensation product of ethylene, urea and formaldehyde; said polyalcohol being selected from the group consisting of pentaerythritol, dipentaerythritol and derivatives thereof; and said aluminum hydroxide and the combination of ammonium polyphosphate and synergetically active component being contained in a ratio by weight of 1:1 to 15:1.

12. A flame-retardant unsaturated polyester resin as claimed in claim 11, wherein said ammonium polyphosphate has been encapsulated by a polycarbodiimide formed by reaction of a polyisocyanate with a carbodiimidization catalyst.

13. A flame-retardant unsaturated polyester resin as claimed in claim 11, wherein said ammonium polyphosphate has been encapsulated by a polyurethane formed by reaction of a polyisocyanate and a polyhydroxy compound.

14. A flame-retardant unsaturated polyester resin as claimed in claim 11, wherein said ammonium polyphosphate has been encapsulated by a polyisocyanurate formed by reaction of a polyisocyanate with a trimerization catalyst.

15. A flame-retardant unsaturated polyester resin as claimed in claim 11, wherein said ammonium polyphosphate has been encapsulated by a polyurea formed by reaction of a polyisocyanate and water.

16. A flame-retardant unsaturated polyester resin as claimed in claim 11, wherein said ammonium polyphosphate has been encapsulated by a cured melamine/formaldehyde-resin.

17. A flame-retardant unsaturated polyester resin as claimed in claim 11, wherein said ammonium polyphosphate has been encapsulated by a cured epoxide resin.

18. A flame-retardant unsaturated polyester resin as claimed in claim 11, containing said ammonium polyphosphate and said synergetically active component in a ratio by weight of 1:1 to 10:1.

19. A flame-retardant unsaturated polyester resin as claimed in claim 11, wherein said polymer is a polymer reinforced by glass fibres.

20. A flame-retardant unsaturated polyester resin as claimed in claim 11, wherein said water-insoluble synthetic resin is cured.

* * * * *

UNITED STATES PATENT AND TRADEMARK OFFICE
CERTIFICATE OF CORRECTION

PATENT NO. : 4,957,950

DATED : September 18, 1990

INVENTOR(S) : Staendeke et al

It is certified that error appears in the above-identified patent and that said Letters Patent is hereby corrected as shown below:

On the title page item [73] Assignee: please correct the address of Hoechst Aktiengesellschaft to read: --Frankfurt/Main 80, Federal Republic of Germany--.

Signed and Sealed this

Nineteenth Day of May, 1992

Attest:

DOUGLAS B. COMER

*Attesting Officer*   Acting Commissioner of Patents and Trademarks